(12) United States Patent
Chen et al.

(10) Patent No.: US 10,199,186 B1
(45) Date of Patent: Feb. 5, 2019

(54) KEY STRUCTURE WITH EXTENSIONS TO PROVIDE HAPTIC FEEDBACK

(71) Applicant: Primax Electronics Ltd., Taipei (TW)

(72) Inventors: Bo-An Chen, Taipei (TW); Chin-Sung Pan, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 15/879,874

(22) Filed: Jan. 25, 2018

(30) Foreign Application Priority Data

Sep. 15, 2017 (TW) .............................. 106131800 A (51) Int. Cl.
*H01H 13/702* (2006.01)
*H01H 13/7073* (2006.01)
*G06F 3/02* (2006.01)

(52) U.S. Cl.
CPC ....... *H01H 13/7073* (2013.01); *G06F 3/0202* (2013.01); *H01H 13/702* (2013.01); *H01H 2209/006* (2013.01); *H01H 2215/00* (2013.01); *H01H 2237/00* (2013.01)

(58) Field of Classification Search
CPC ........ H01H 3/12; H01H 3/125; H01H 13/702; H01H 13/14; H01H 13/70; H01H 2215/00; H01H 2209/006; H01H 2237/00
See application file for complete search history.

(56) References Cited

U.S. PATENT DOCUMENTS 7,135,647 B2 * 11/2006 Takahashi .............. H01H 3/125
 200/5 A
9,847,188 B2 * 12/2017 Huang .................. G06F 1/1666

* cited by examiner

*Primary Examiner* — Vanessa Girardi
(74) *Attorney, Agent, or Firm* — Kirton McConkie; Evan R. Witt (57) ABSTRACT

A keyboard device includes a base plate, a key structure and a membrane wiring board. The key structure is connected with the base plate. The membrane wiring board includes a membrane switch. The membrane wiring board is arranged between the key structure and the base plate. When the keycap of the key structure is moved upwardly or downwardly relative to the base plate, the connecting element between the keycap and the base plate interferes with the membrane wiring board or the base plate. Consequently, a click sound is generated, and a feedback feel is provided.

11 Claims, 13 Drawing Sheets

KEY STRUCTURE WITH EXTENSIONS TO PROVIDE HAPTIC FEEDBACK

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users pay much attention to the keyboard devices.

Figure 1:
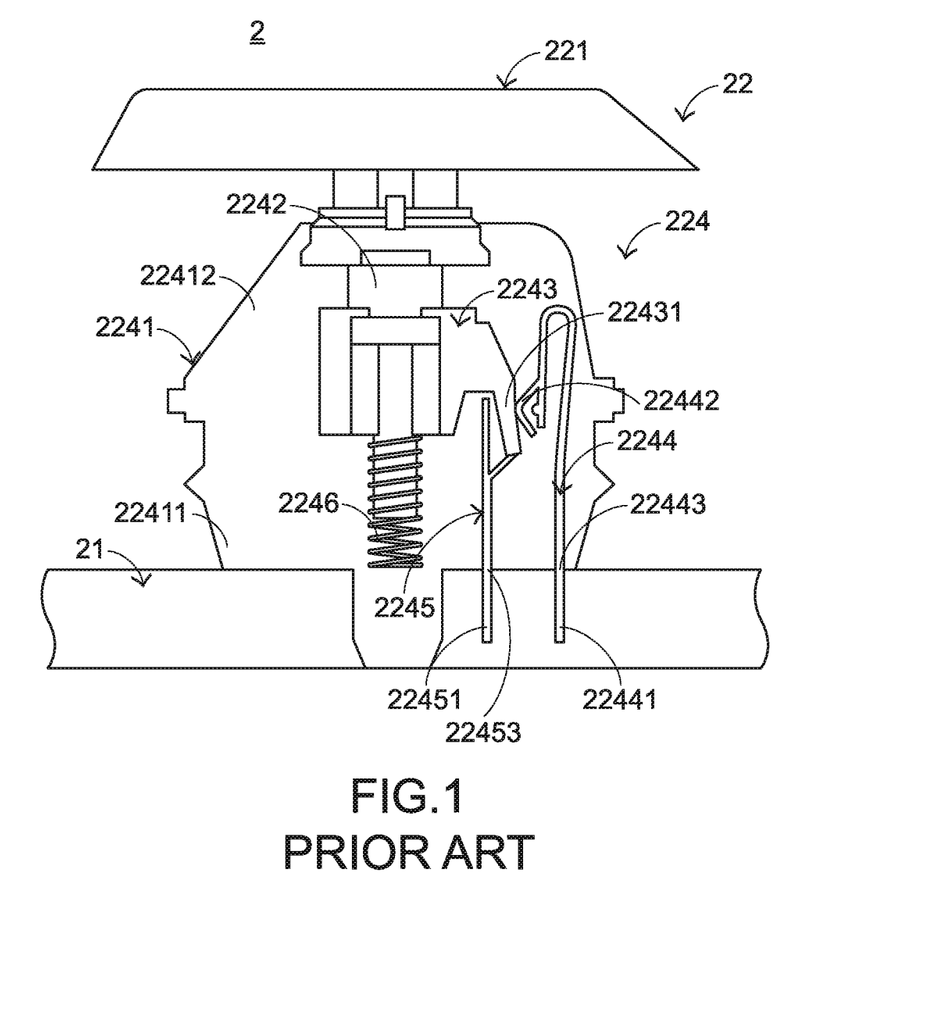
FIG. 1 is a schematic cross-sectional view illustrating a conventional keyboard device with a mechanical key structure.
Figure 2:
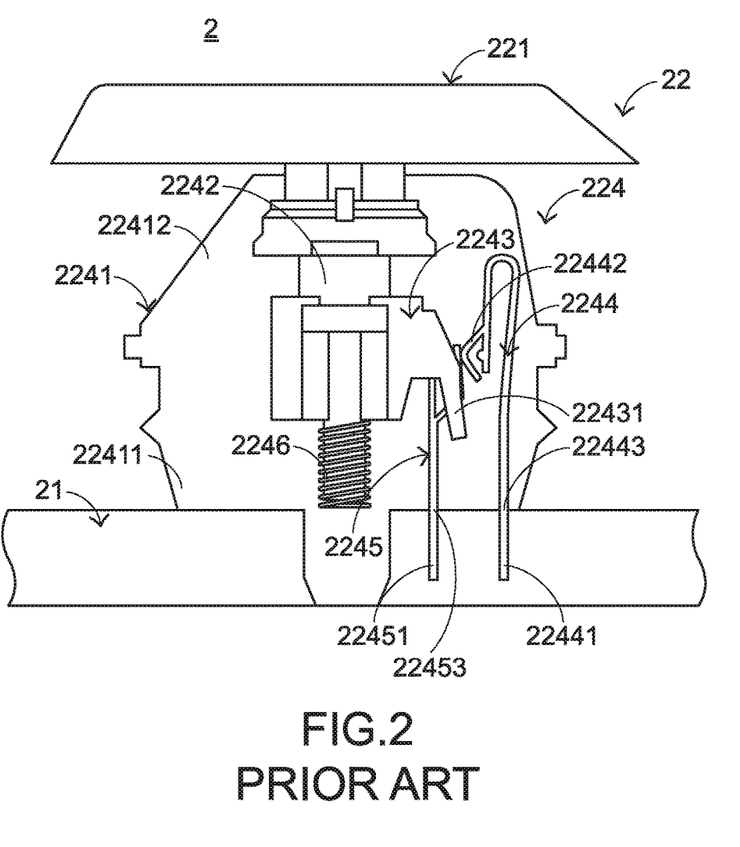
FIG. 2 is a schematic cross-sectional view illustrating the mechanical switch of the conventional keyboard device of FIG. 1 when a keycap of the mechanical key structure is depressed.

Hereinafter, the structure and function of a conventional keyboard device with a mechanical key structure will be described with reference to FIGS. 1 and 2. FIG. 1 is a schematic cross-sectional view illustrating a conventional keyboard device with a mechanical key structure. FIG. 2 is a schematic cross-sectional view illustrating the mechanical switch of the conventional keyboard device of FIG. 1 when a keycap of the mechanical key structure is depressed. For succinctness, only one mechanical key structure and associated components are shown in FIGS. 1 and 2. The keyboard device 2 comprises plural mechanical key structures 22 and a circuit board 21. Each mechanical key structure 22 comprises a keycap 221 and a mechanical switch 224. The mechanical switch 224 is arranged between the keycap 221 and the circuit board 21. The mechanical switch 224 comprises a casing 2241, a push element 2242, a linkage element 2243, a first spring strip 2244, a second spring strip 2245 and an elastic element 2246. The linkage element 2243, the elastic element 2246, at least a part of the push element 2242, at least a part of the first spring strip 2244 and at least a part of the second spring strip 2245 are accommodated within the casing 2241.

The casing 2241 comprises a pedestal 22411 and an upper cover 22412. The pedestal 22411 is covered by the upper cover 22412. Moreover, the upper cover 22412 has an upper cover opening 22413. A first end of the push element 2242 is penetrated through the upper cover opening 22413 and contacted with the keycap 221. A second end of the push element 2242 is disposed within the casing 2241 and connected with the linkage element 2243. The linkage element 2243 is located at a middle region of the pedestal 22411. Moreover, the linkage element 2243 is movable upwardly or downwardly relative to the pedestal 22411. The linkage element 2243 has a protrusion structure 22431. The protrusion structure 22431 is extended from a sidewall of the linkage element 2243 and toward the first spring strip 2244. The elastic element 2246 is located under the linkage element 2243. A first end of the elastic element 2246 is connected with the linkage element 2243. A second end of the elastic element 2246 is fixed on the pedestal 22411. Moreover, the elastic element 2246 provides an elastic force to the linkage element 2243.

The first spring strip 2244 is located near a sidewall of the pedestal 22411. The first spring strip 2244 comprises a first electric connection part 22441, an elastic part 22442 and a first fixing part 22443. The first fixing part 22443 is fixed on the pedestal 22411. Moreover, the first fixing part 22443 is arranged between the first electric connection part 22441 and the elastic part 22442. The elastic part 22442 is disposed within the casing 2241 and contacted with the protrusion structure 22431 of the linkage element 2243. Moreover, the elastic part 22442 can be swung relative to the first fixing part 22443. After the first electric connection part 22441 is penetrated downwardly through the pedestal 22411, the first electric connection part 22441 is contacted and electrically connected with the circuit board 21. The second spring strip 2245 is arranged between the linkage element 2243 and the first spring strip 2244. The second spring strip 2245 comprises a second electric connection part 22451, a conduction part 22452 and a second fixing part 22453. The second fixing part 22453 is fixed on the pedestal 22411. Moreover, the second fixing part 22453 is arranged between the second electric connection part 22451 and the conduction part 22452. The conduction part 22452 is disposed within the casing 2241. After the second electric connection part 22451 is penetrated downwardly through the pedestal 22411, the second electric connection part 22451 is contacted and electrically connected with the circuit board 21.

While the keycap 221 is depressed, the keycap 221 is moved downwardly to push the push element 2242. Since the linkage element 2243 is connected with the push element 2242, the linkage element 2243 is moved downwardly with the push element 2242. At the same time, the elastic element 2246 is compressed to generate the elastic force. As the linkage element 2243 is moved downwardly, the protrusion structure 22431 of the linkage element 2243 is contacted with the elastic part 22442 of the first spring strip 2244. Moreover, the protrusion structure 22431 is moved downwardly relative to the elastic part 22442 so as to push the elastic part 22442. Consequently, the elastic part 22442 is swung relative to the first fixing part 22443. As the linkage element 2243 is continuously moved downwardly, the swung elastic part 22442 correspondingly contacts and collides with the conduction part 22452 of the second spring strip 2245. Meanwhile, as shown in FIG. 2, the first spring strip 2244 and the second spring strip 2245 are in contact with each other. Consequently, the circuit board 21 generates a corresponding key signal.

When the elastic part 22442 of the first spring strip 2244 collides with the conduction part 22452 of the second spring strip 2245, a click sound is generated. Due to the click sound, the user can feel the feedback of depressing the keycap 221. Moreover, when the keycap 221 is no longer depressed, the linkage element 2243 and the push element 2242 are moved upwardly in response to the elastic force of the elastic element 2246. Consequently, the keycap 221 is returned to its original position as shown in FIG. 1. The operations of the mechanical switch 224 are well known to those skilled in the art, and are not redundantly described herein. The type of the mechanical switch 224 is not restricted to that of FIGS. 1 and 2.

However, the mechanical switch still has some drawbacks. For example, since the structure of the mechanical switch is complicated, the fabricating cost of the mechanical switch is high. Moreover, it is difficult to reduce the thickness of the keyboard device with the mechanical switch. That is, the keyboard device with the mechanical switch cannot meet the requirements of light weightiness, slimness and small size. For solving these drawbacks, a keyboard device with a membrane switch has been introduced into the market.

Figure 3:
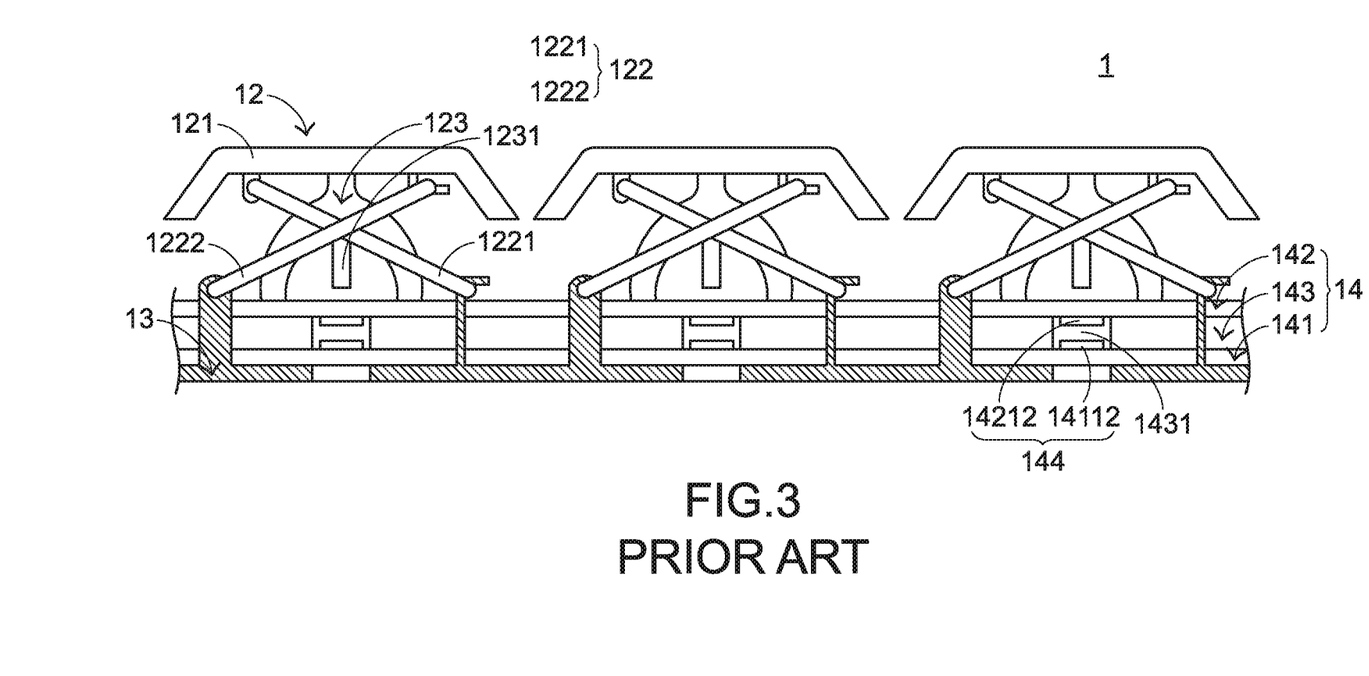
FIG. 3 is a schematic side view illustrating a conventional keyboard device with a membrane switch.
Figure 4:
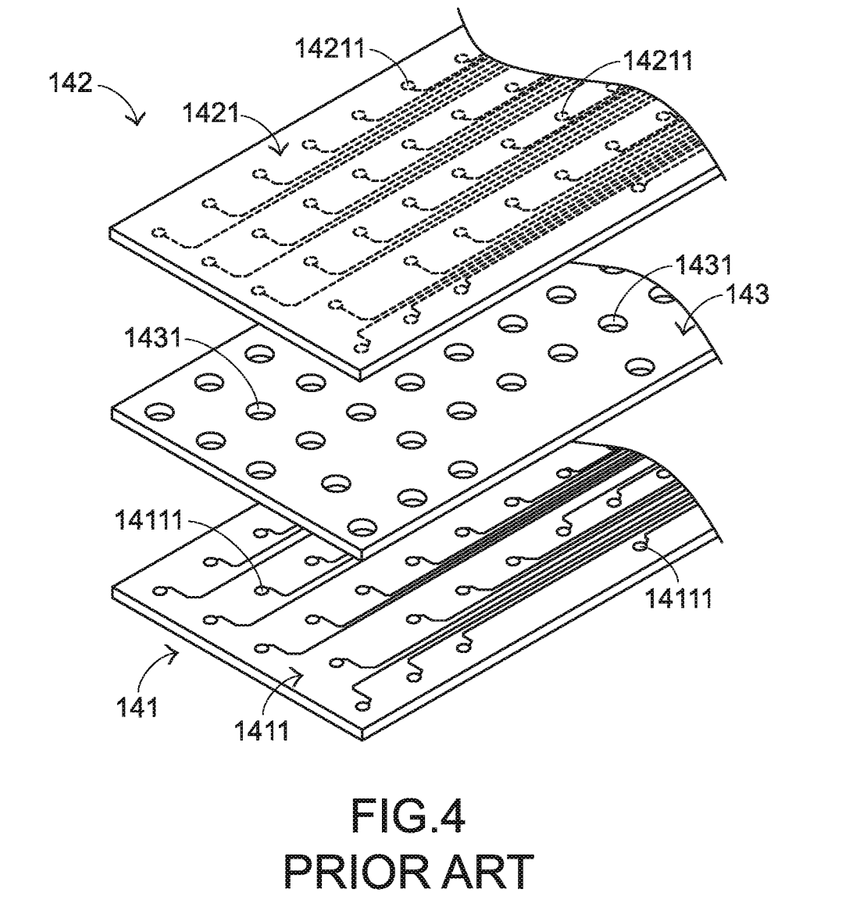
FIG. 4 is a schematic exploded view illustrating a portion of a membrane wiring board of the conventional keyboard device of FIG. 3.

Please refer to FIGS. 3 and 4. FIG. 3 is a schematic side view illustrating a conventional keyboard device with a membrane switch. FIG. 4 is a schematic exploded view illustrating a portion of a membrane wiring board of the conventional keyboard device of FIG. 3. The conventional keyboard device 1 comprises a base plate 13, a membrane wiring board 14 and plural key structures 12. Each of the plural key structures 12 comprises a keycap 121, a scissors-type connecting element 122 and an elastic element 123. The scissors-type connecting element 122 is connected between the keycap 121 and the base plate 13. Moreover, the scissors-type connecting element 122 comprises a first frame 1221 and a second frame 1222. The second frame 1222 is pivotally coupled to the first frame 1221. Consequently, the first frame 1221 and the second frame 1222 can be swung relative to each other. The elastic element 123 is arranged between the keycap 121 and the membrane wiring board 14. Moreover, the elastic element 123 comprises a contacting part 1231.

The membrane wiring board 14 comprises an upper film layer 142, a lower film layer 141 and an intermediate film layer 143. The intermediate film layer 143 is arranged between the upper film layer 142 and the lower film layer 141. A first circuit pattern 1421 is formed on a bottom surface of the upper film layer 142. The first circuit pattern 1421 comprises plural upper contacts 14211 corresponding to the plural key structures 12. A second circuit pattern 1411 is formed on a top surface of the lower film layer 141. The second circuit pattern 1411 comprises plural lower contacts 14111 corresponding to the plural upper contacts 14211. In addition, the intermediate film layer 143 comprises plural perforations 1431 corresponding to the plural upper contacts 14211 and the plural lower contacts 14111. Each of the upper contacts 14211 and the corresponding lower contact 14111 are collectively defined as a membrane switch 144.

While the keycap 121 of any key structure 12 is depressed and moved downwardly relative to the base plate 13, the first frame 1221 and the second frame 1222 of the scissors-type connecting element 122 are switched from an open-scissors state to a stacked state. Moreover, as the keycap 121 is moved downwardly to compress the elastic element 123, the corresponding upper contact 14211 is contacted with and triggered by the contacting part 1231 of the elastic element 123. Consequently, the corresponding upper contact 14211 is penetrated through the corresponding perforation 1431 and contacted with the corresponding lower contact 14111. Under this circumstance, the corresponding membrane switch 144 is electrically conducted. When the keycap 121 of the key structure 12 is no longer depressed, the keycap 121 is moved upwardly relative to the base plate 13 in response to an elastic force of the elastic element 123. Meanwhile, the first frame 1221 and the second frame 1222 are switched from the stacked state to the open-scissors state again, and the keycap 121 is returned to its original position.

As mentioned above, the keyboard device with the membrane switch is slim, and the fabricating cost is reduced. However, unlike the mechanical switch, the depressing action on the membrane switch cannot generate the click sound. That is, the user cannot feel the feedback of depressing the keycap. Consequently, the conventional keyboard device needs to be further improved.

SUMMARY OF THE INVENTION

The present invention relates to a keyboard device a membrane switch. A connecting element of a key structure interferes with a membrane wiring board or a base plate to provide a feedback feel like a mechanical switch.

In accordance with an aspect of the present invention, there is provided a keyboard device. The keyboard device includes a base plate, a key structure and a membrane wiring board. The key structure includes a keycap and a connecting element. The connecting element is connected between the base plate and the keycap. When the connecting element is operated along a movable range, the keycap is moved upwardly or downwardly relative to the base plate. The membrane wiring board is arranged between the key structure and the base plate. The membrane wiring board includes a membrane switch corresponding to the key structure. The membrane wiring board includes at least one circuit board opening and a circuit board extension part. The circuit board extension part is extended toward the at least one circuit board opening. The circuit board extension part is located within the movable range of the connecting element. When the connecting element is operated, the connecting element interferes with the circuit board extension part.

In accordance with another aspect of the present invention, there is provided a keyboard device. The keyboard device includes a base plate, a key structure and a membrane wiring board. The key structure includes a keycap and a connecting element. The connecting element is connected between the base plate and the keycap. When the connecting element is operated along a movable range, the keycap is moved upwardly or downwardly relative to the base plate. The membrane wiring board is arranged between the key structure and the base plate, and includes a membrane switch corresponding to the key structure. The base plate includes at least one base plate opening and a base plate extension part. The base plate extension part is extended toward the at least one base plate opening. The base plate extension part is located within the movable range of the connecting element. When the connecting element is operated, the connecting element interferes with the base plate extension part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 5:
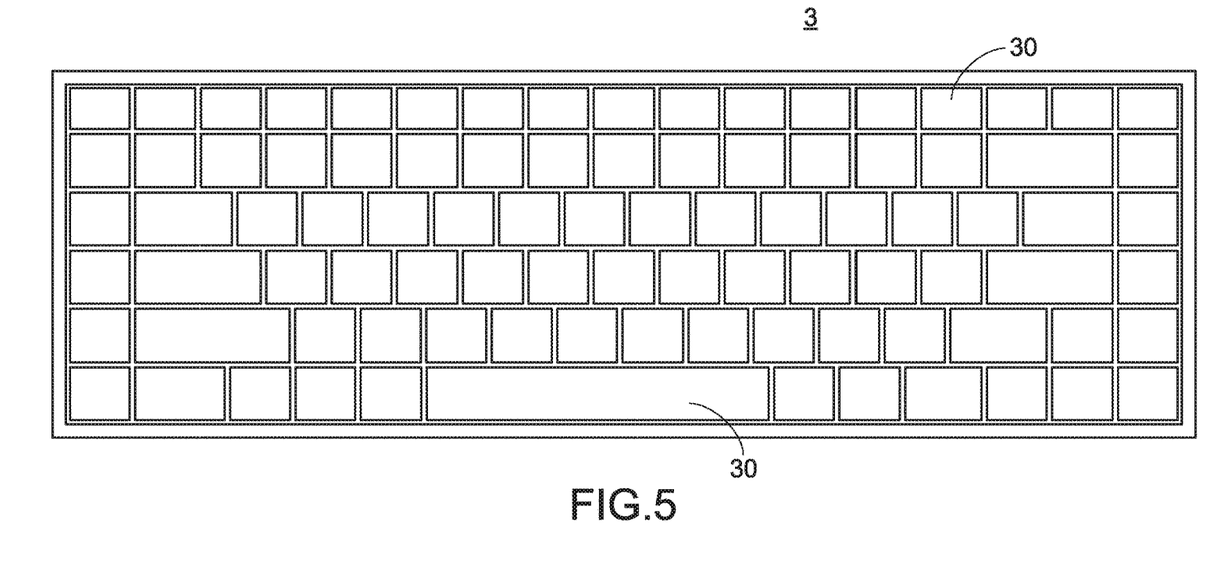
FIG. 5 is a schematic top view illustrating a keyboard device according to a first embodiment of the present invention.
Figure 6:
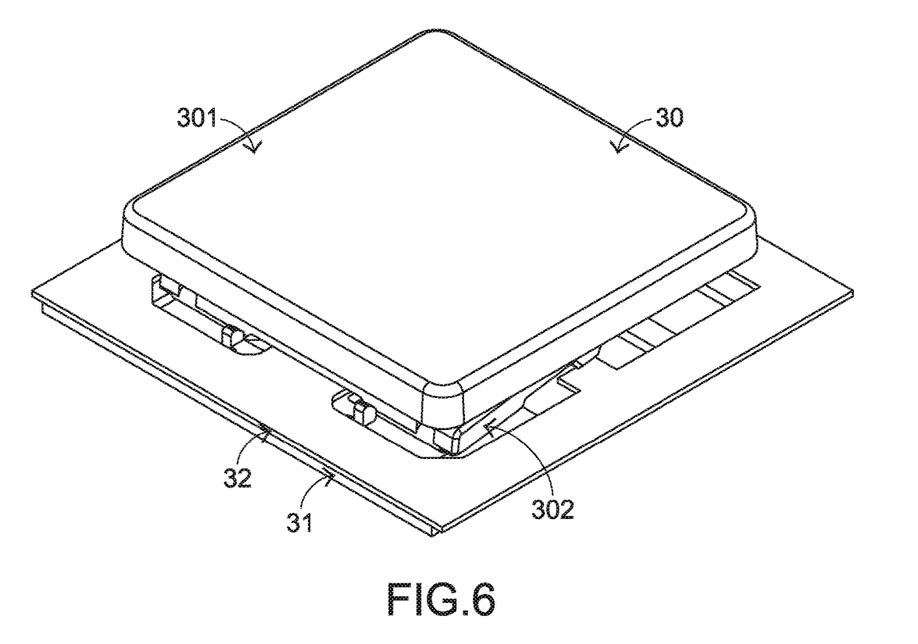
FIG. 6 is a schematic perspective view illustrating a portion of the keyboard device as shown in FIG. 5.
Figure 7:
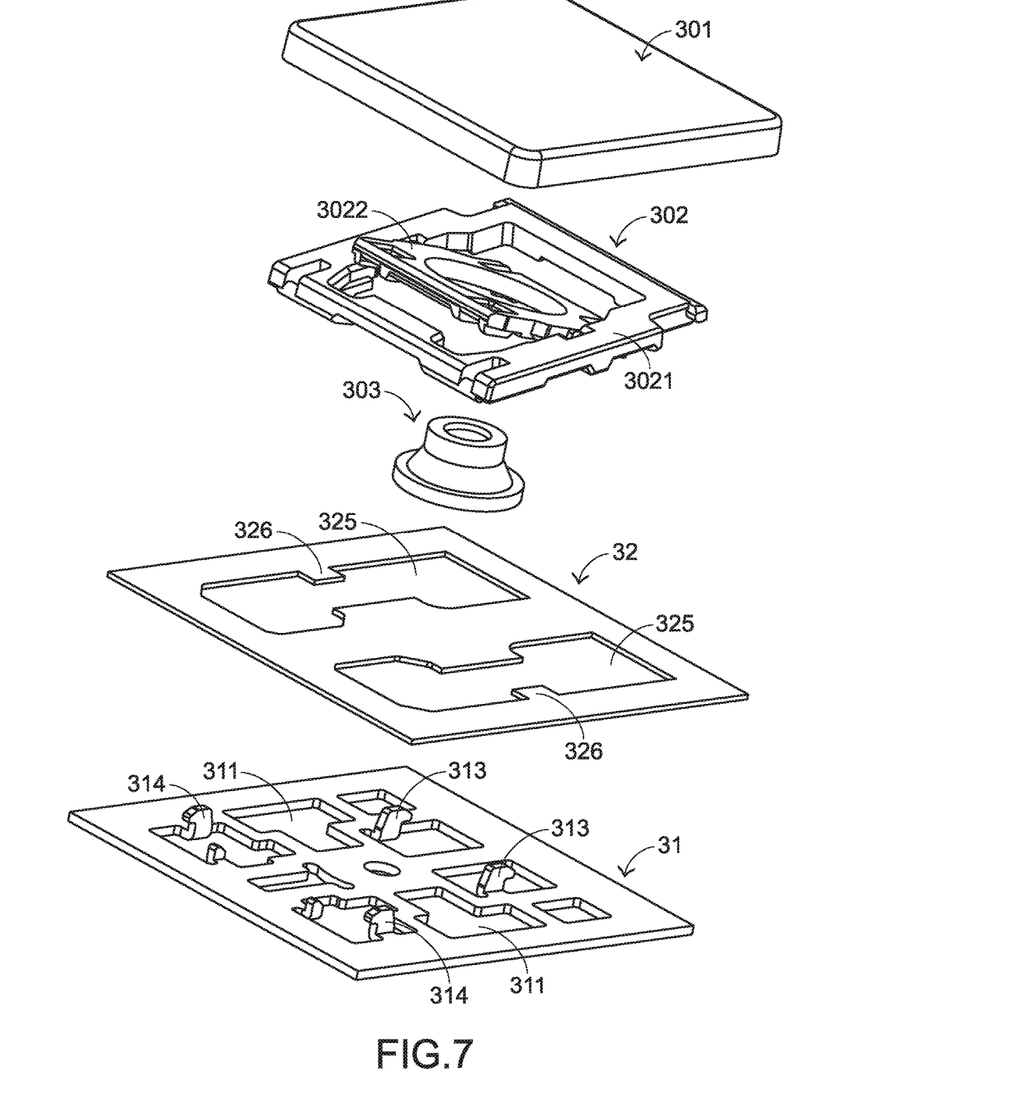
FIG. 7 is a schematic exploded view illustrating a portion of the keyboard device as shown in FIG. 5 and taken along a viewpoint.
Figure 8:
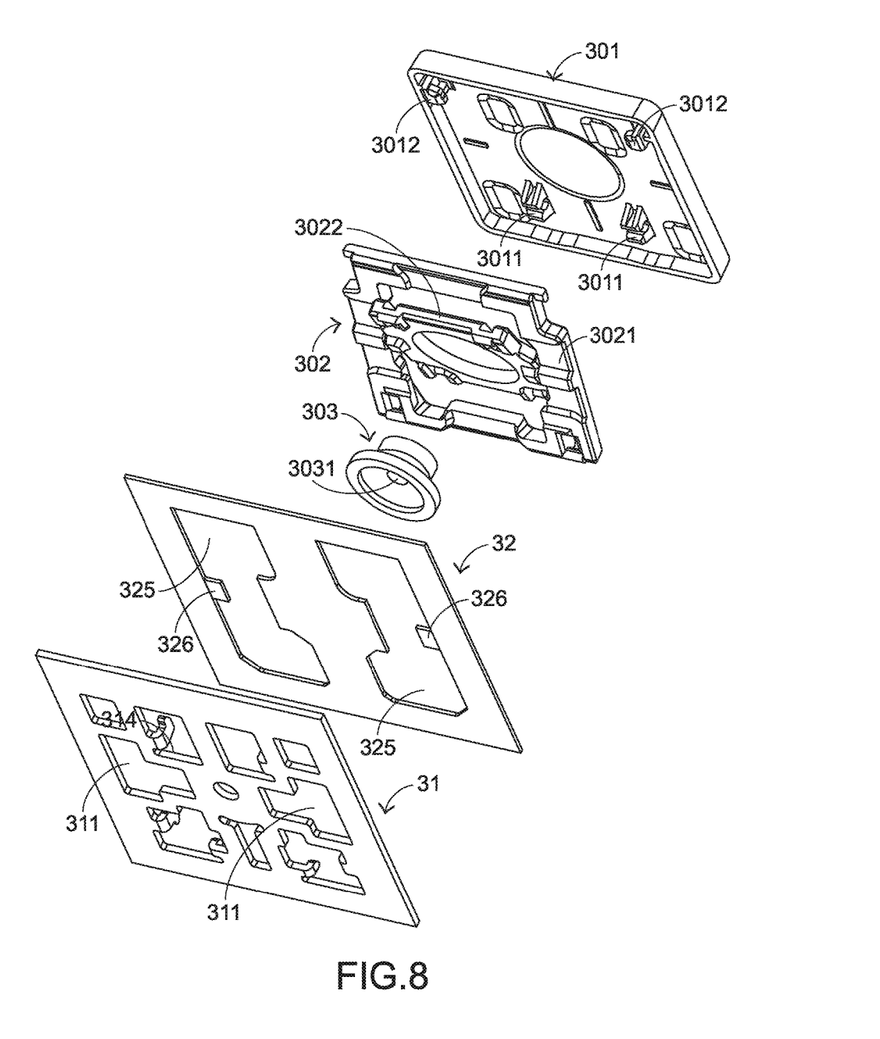
FIG. 8 is a schematic exploded view illustrating a portion of the keyboard device as shown in FIG. 5 and taken along another viewpoint.

Please refer to FIGS. 5, 6, 7 and 8. FIG. 5 is a schematic top view illustrating a keyboard device according to a first embodiment of the present invention. FIG. 6 is a schematic perspective view illustrating a portion of the keyboard device as shown in FIG. 5. FIG. 7 is a schematic exploded view illustrating a portion of the keyboard device as shown in FIG. 5 and taken along a viewpoint. FIG. 8 is a schematic exploded view illustrating a portion of the keyboard device as shown in FIG. 5 and taken along another viewpoint. For succinctness, only one key structure is shown in FIGS. 6, 7 and 8. The keyboard device 3 comprises plural key structures 30, a base plate 31 and a membrane wiring board 32. The membrane wiring board 32 is arranged between the plural key structures 30 and the base plate 31. These key structures 30 are classified into some types, e.g., ordinary keys, numeric keys and function keys. When one of the key structures 30 is depressed by the user's finger, a corresponding key signal is generated to the computer, and thus the computer executes a function corresponding to the depressed key structure. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Each of the key structures 30 comprises a keycap 301, a connecting element 302 and an elastic element 303. The connecting element 302 is connected between the keycap 301 and the base plate 31. Through the connecting element 302, the keycap 301 is moved upwardly or downwardly relative to the base plate 31 along a movable range. The elastic element 303 is arranged between the keycap 301 and the base plate 31. Moreover, the elastic element 303 comprises a contacting part 3031. In this embodiment, the connecting element 302 is a scissors-type connecting element. Moreover, the connecting element 302 comprises a first frame 3021 and a second frame 3022. The second frame 3022 is pivotally coupled to the first frame 3021. Each keycap 301 comprises a connecting lock part 3011 and a connecting hook part 3012.

The base plate 31 comprises at least one base plate opening 311, a first hook 313 and a second hook 314. The at least one base plate opening 311 is located under the key structure 30. The first hook 313 and the second hook 314 are protruded upwardly and penetrated through the membrane wiring board 32. A first end of the first frame 3021 is connected with the connecting lock part 3011 of the keycap 301. A second end of the first frame 3021 is connected with the second hook 314 of the base plate 31. A first end of the second frame 3022 is connected with the connecting hook part 3012 of the keycap 301. A second end of the second frame 3022 is connected with the first hook 313 of the base plate 31. The connecting relationships between the connecting element 302, the base plate 31 and the keycap 301 are presented herein for purpose of illustration and description only.

Due to the above design, the first frame 3021 and the second frame 3022 can be swung relative to each other. That is, the first frame 3021 and the second frame 3022 are selectively switched from an open-scissors state to a stacked state or switched from the stacked state to the open-scissors. In an embodiment, the movable range of the connecting element 302 is defined as the traveling distance of the connecting element 302 when the first frame 3021 and the second frame 3022 are switched from the open-scissors state to the stacked state.

The membrane wiring board 32 comprises at least one circuit board opening 325 under the at least one key structure 30. The first hook 313 and the second hook 314 of the base plate 31 are penetrated upwardly through the circuit board opening 325 of the membrane wiring board 32. Moreover, the membrane wiring board 32 comprises at least one circuit board extension part 326. The at least one circuit board extension part 326 is extended toward the circuit board opening 325 and located within the movable range of the connecting element 302. In case that the keyboard device 3 is a luminous keyboard, the light beams emitted by a light source (not shown) are allowed to pass through the circuit board opening 325. It is noted that the functions of the circuit board opening 325 are not restricted.

Figure 9:
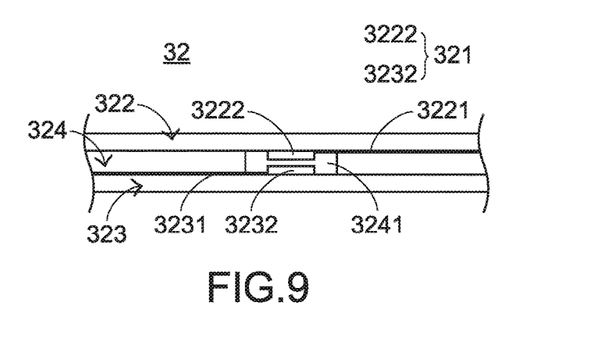
FIG. 9 is a schematic exploded view illustrating the membrane wiring board of the keyboard device as shown in FIG. 5.

The membrane wiring board 32 further comprises plural film layers. FIG. 9 is a schematic exploded view illustrating the membrane wiring board of the keyboard device as shown in FIG. 5. The membrane wiring board 32 comprises plural film layers, which are arranged in a stack form. In this embodiment, the membrane wiring board 32 comprises an upper film layer 322 and a lower film layer 323. A first circuit pattern 3221 is formed on a bottom surface of the upper film layer 322. The first circuit pattern 3221 comprises plural upper contacts 3222 corresponding to the plural key structures 30. A second circuit pattern 3231 is formed on a top surface of the lower film layer 323. The second circuit pattern 3231 comprises plural lower contacts 3232 corresponding to the plural upper contacts 3222. Each of the upper contacts 3222 and the corresponding lower contact 3232 are separated from each other by a spacing interval. Moreover, each of the upper contacts 3222 and the corresponding lower contact 3232 are collectively defined as a membrane switch 321. Moreover, for maintaining the spacing interval between each upper contact 3222 and the corresponding lower contact 3232, the membrane wiring board 32 further comprises an intermediate film layer 324. The intermediate film layer 324 is arranged between the upper film layer 322 and the lower film layer 323. In addition, the intermediate film layer 324 comprises plural perforations 3241 corresponding to the plural upper contacts 3222 and the plural lower contacts 3232. Preferably but not exclusively, at least one of the upper film layer 322, the lower film layer 323 and the intermediate film layer 324 is made of polycarbonate (PC), polyethylene terephthalate (PET), polymethylmethacrylate (PMMA), polyurethane (PU) or polyimide (PI).

Figure 10:
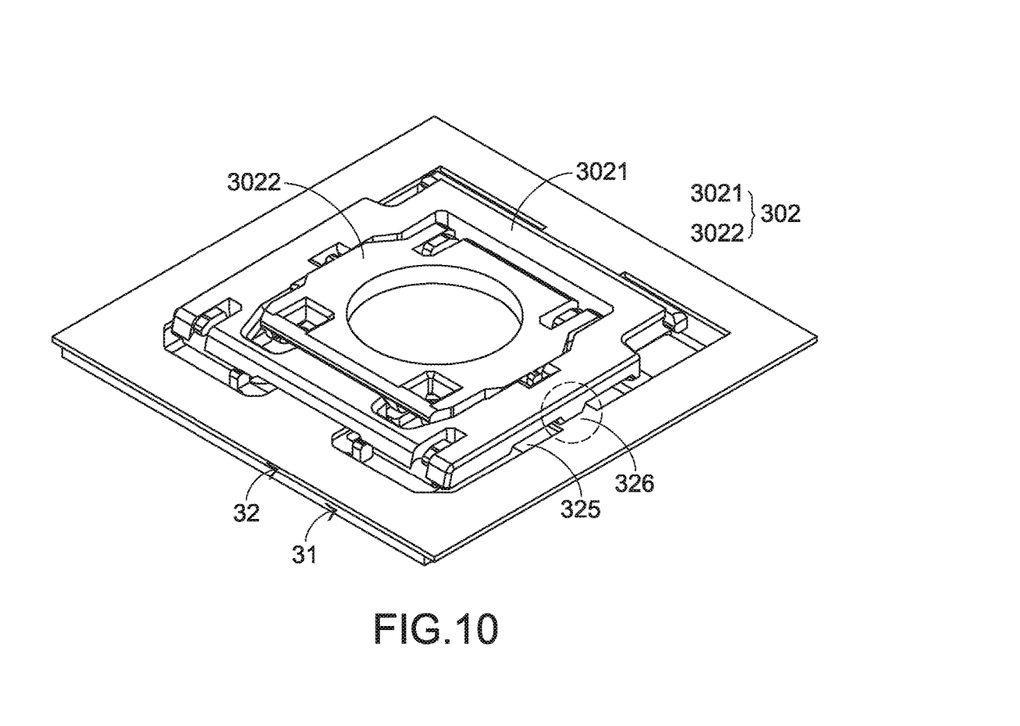
FIG. 10 is a schematic perspective view illustrating a portion of the keyboard device as shown in FIG. 6, in which the key structure is depressed.

FIG. 10 is a schematic perspective view illustrating a portion of the keyboard device as shown in FIG. 6, in which the key structure is depressed. For succinctness, only one key structure and associated components are shown in FIG. 10, and the keycap and the elastic element is not shown. While the keycap 301 of any key structure 30 is depressed and moved downwardly relative to the base plate 31, the first frame 3021 and the second frame 3022 of the connecting element 302 are switched from the open-scissors state to the stacked state. Moreover, as the keycap 301 is moved downwardly to compress the elastic element 303, the corresponding upper contact 3222 is pushed and triggered by the contacting part 3031 of the elastic element 303. Consequently, the corresponding upper contact 3222 is contacted with the corresponding lower contact 3232 through the corresponding perforation 3241. In such way, the corresponding membrane switch 321 is electrically conducted, and the keyboard device 3 generates a corresponding key signal. When the keycap 301 of the key structure 30 is no longer depressed, the keycap 301 is moved upwardly relative to the base plate 31 in response to an elastic force of the elastic element 303. Meanwhile, the first frame 3021 and the second frame 3022 are switched from the stacked state to the open-scissors state again, and the keycap 301 is returned to its original position.

Moreover, while the key cap 301 of any key structure 30 is depressed and moved downwardly, the circuit board extension part 326 of the membrane wiring board 32 is within the movable range of the connecting element 302. Consequently, the first frame 3021 of the connecting element 302 interferes with the corresponding circuit board extension part 326 to generate a click sound. As shown in FIG. 10, the interference region is circumscribed with a dotted circle. When the keycap 301 of the key structure 30 is no longer depressed, the first frame 3021 of the connecting element 302 does not interfere with the corresponding circuit board extension part 326. Meanwhile, the circuit board extension part 326 is swung to generate the click sound. Due to the click sound, the user can feel the feedback of depressing the keycap 301.

Figure 11:
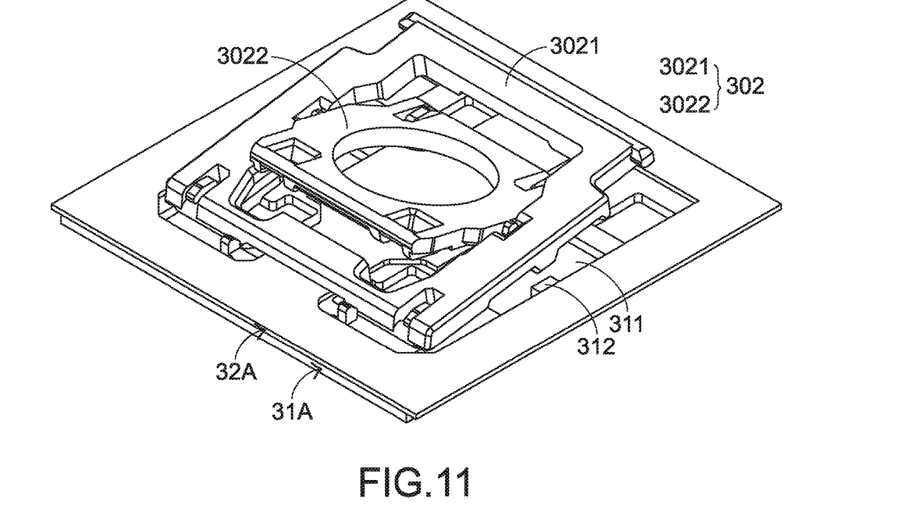
FIG. 11 is a schematic perspective view illustrating a portion of a keyboard device according to a second embodiment of the present invention.
Figure 12:
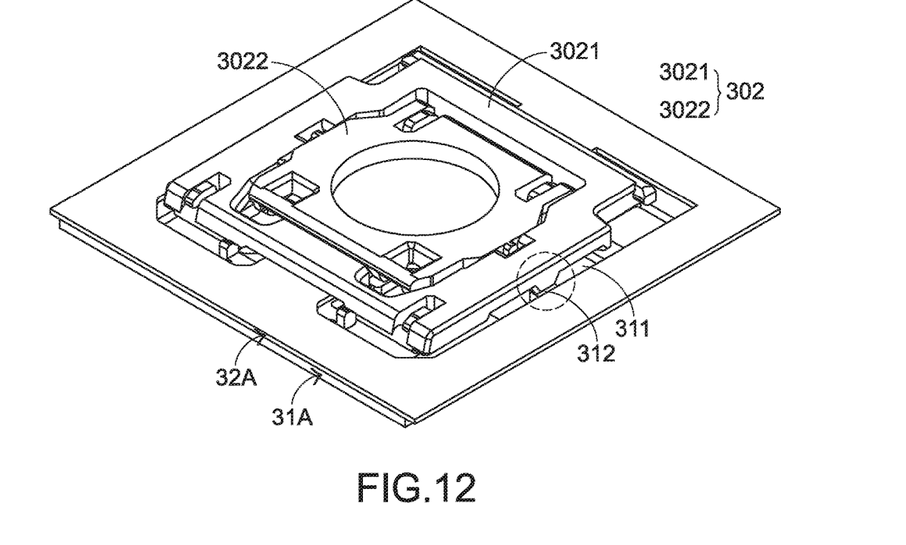
FIG. 12 is a schematic perspective view illustrating a portion of the keyboard device as shown in FIG. 11, in which the key structure is depressed.

Please refer to FIGS. 11 and 12. FIG. 11 is a schematic perspective view illustrating a portion of a keyboard device according to a second embodiment of the present invention. FIG. 12 is a schematic perspective view illustrating a portion of the keyboard device as shown in FIG. 11, in which the key structure is depressed. For succinctness, only one key structure and associated components are shown in FIGS. 11 and 12, and the keycap and the elastic element is not shown. The structures and functions of the components of the keyboard device which are identical to those of the first embodiment are not redundantly described herein. In comparison with the first embodiment, the membrane wiring board 32A of the keyboard device of this embodiment is not equipped with the circuit board extension part. Moreover, the base plate 31A further comprises at least one base plate extension part 312. The at least one base plate extension part 312 is extended toward the at least one base plate opening 311 and located within the movable range of the connecting element 302. While the key cap 301 of any key structure 30 is depressed and moved downwardly, the first frame 3021 of the connecting element 302 interferes with the corresponding base plate extension part 312 to generate a click sound. As shown in FIG. 12, the interference region is circumscribed with a dotted circle. When the keycap 301 of the key structure 30 is no longer depressed, the first frame 3021 of the connecting element 302 does not interfere with the corresponding base plate extension part 312. Meanwhile, the base plate extension part 312 is swung to generate the click sound. Due to the click sound, the user can feel the feedback of depressing the keycap 301.

Figure 13:
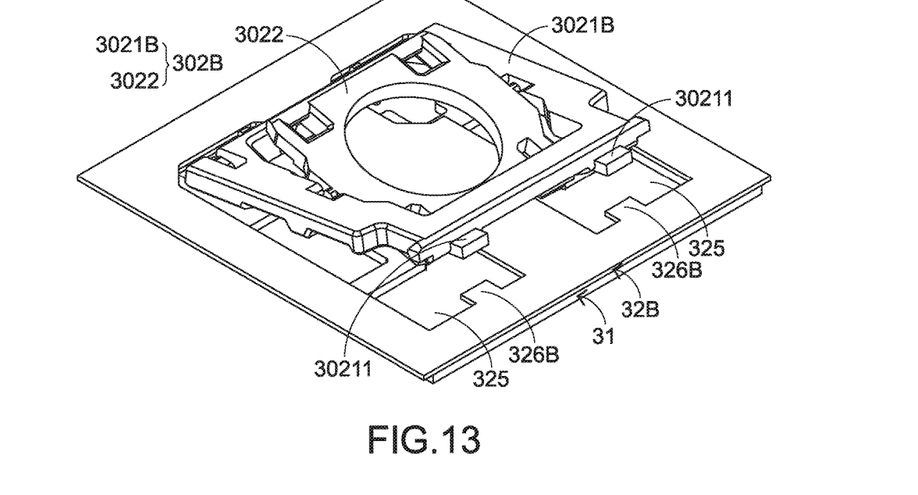
FIG. 13 is a schematic perspective view illustrating a portion of a keyboard device according to a third embodiment of the present invention.
Figure 14:
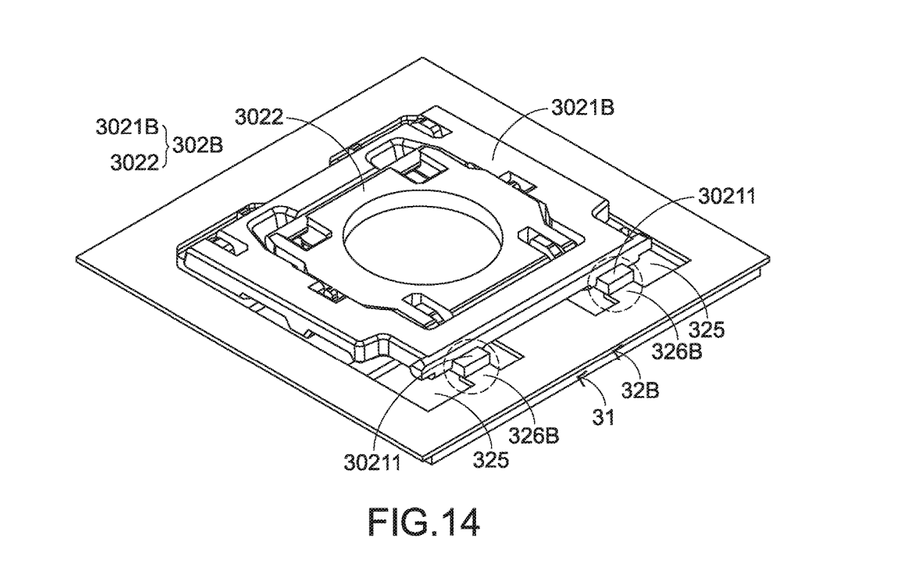
FIG. 14 is a schematic perspective view illustrating a portion of the keyboard device as shown in FIG. 13, in which the key structure is depressed.

Please refer to FIGS. 13 and 14. FIG. 13 is a schematic perspective view illustrating a portion of a keyboard device according to a third embodiment of the present invention. FIG. 14 is a schematic perspective view illustrating a portion of the keyboard device as shown in FIG. 13, in which the key structure is depressed. For succinctness, only one key structure and associated components are shown in FIGS. 13 and 14, and the keycap and the elastic element is not shown. The structures and functions of the components of the keyboard device which are identical to those of the first embodiment are not redundantly described herein. In comparison with the first embodiment, the first frame 3021B of the connecting element 302B of the keyboard device of this embodiment further comprises a frame extension part 30211. The frame extension part 30211 is externally extended from the first frame 3021B. The circuit board extension part 326B of the membrane wiring board 32B is aligned with the frame extension part 30211. While the key cap 301 of any key structure 30 is depressed and moved downwardly, the frame extension part 30211 of the first frame 3021B interferes with the corresponding circuit board extension part 326B to generate a click sound. As shown in FIG. 14, the interference region is circumscribed with a dotted circle. When the keycap 301 of the key structure 30 is no longer depressed, the frame extension part 30211 of the first frame 3021B does not interfere with the corresponding circuit board extension part 326B. Meanwhile, the circuit board extension part 326B is swung, and the frame extension part 30211 of the first frame 3021B is also swung. Since both of the circuit board extension part 326B and the frame extension part 30211 are swung to generate the click sound, the user can feel the enhanced feedback of depressing the keycap 301.

Figure 15:
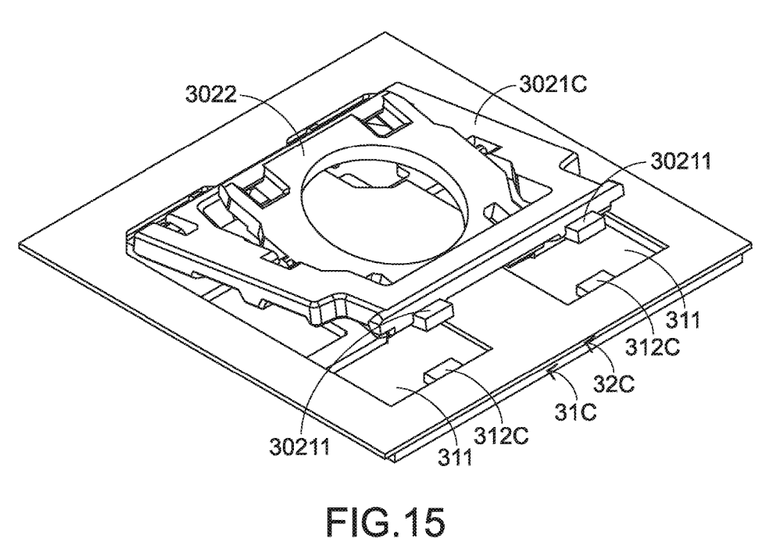
FIG. 15 is a schematic perspective view illustrating a portion of a keyboard device according to a fourth embodiment of the present invention.
Figure 16:
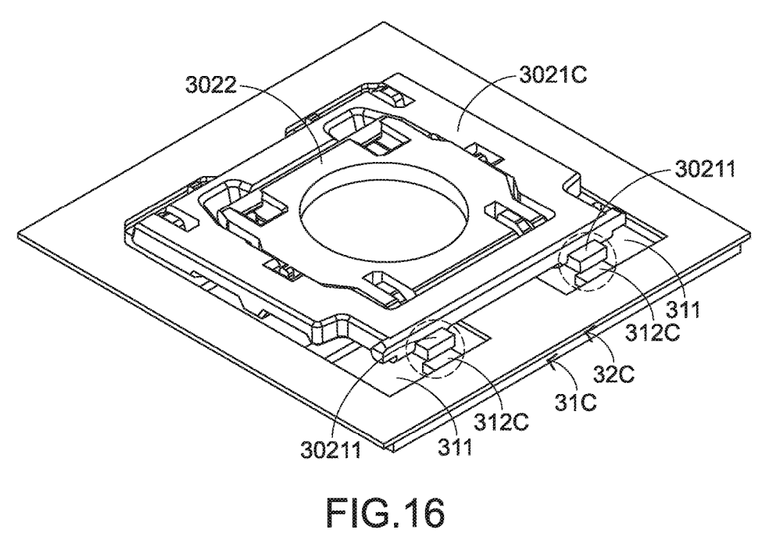
FIG. 16 is a schematic perspective view illustrating a portion of the keyboard device as shown in FIG. 15, in which the key structure is depressed.

Please refer to FIGS. 15 and 16. FIG. 15 is a schematic perspective view illustrating a portion of a keyboard device according to a fourth embodiment of the present invention. FIG. 16 is a schematic perspective view illustrating a portion of the keyboard device as shown in FIG. 15, in which the key structure is depressed. For succinctness, only one key structure and associated components are shown in FIGS. 15 and 16, and the keycap and the elastic element is not shown. The structures and functions of the components of the keyboard device which are identical to those of the third embodiment are not redundantly described herein. In comparison with the third embodiment, the membrane wiring board 32C of the keyboard device of this embodiment is not equipped with the circuit board extension part, and the base plate 31C further comprises a base plate extension part 312C. The base plate extension part 312C is extended toward the base plate opening 311 and aligned with the frame extension part 30211 of the first frame 3021C. While the key cap 301 of any key structure 30 is depressed and moved downwardly, the frame extension part 30211 of the first frame 3021C interferes with the corresponding base plate extension part 312C to generate a click sound. As shown in FIG. 16, the interference region is circumscribed with a dotted circle. When the keycap 301 of the key structure 30 is no longer depressed, the frame extension part 30211 of the first frame 3021C does not interfere with the corresponding base plate extension part 312C. Meanwhile, the base plate extension part 312C is swung, and the frame extension part 30211 of the first frame 3021C is also swung. Since both of the base plate extension part 312C and the frame extension part 30211 are swung to generate the click sound, the user can feel the enhanced feedback of depressing the keycap 301.

Figure 17:
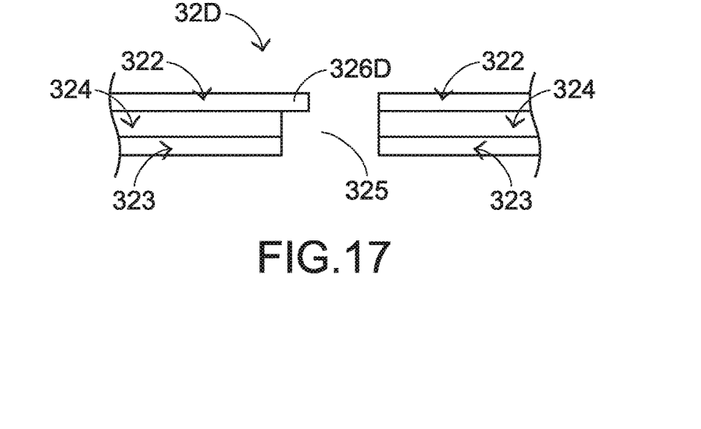
FIG. 17 is a schematic cross-sectional view illustrating a portion of a keyboard device according to a fifth embodiment of the present invention.

It is noted that numerous modifications and alterations may be made while retaining the teachings of the invention. FIG. 17 is a schematic cross-sectional view illustrating a portion of a keyboard device according to a fifth embodiment of the present invention. As shown in FIG. 17, the circuit board extension part 326D of the membrane wiring board 32D is extended from the upper film layer 322 toward the circuit board opening 325. That is, the circuit board extension part 326D is extended over the intermediate film layer 324 and the lower film layer 323. When the connecting element (not shown in FIG. 17) interferes with the corresponding circuit board extension part 326D, a click sound is generated. Under this circumstance, the user can feel the enhanced feedback of depressing the keycap 301.

Figure 18:
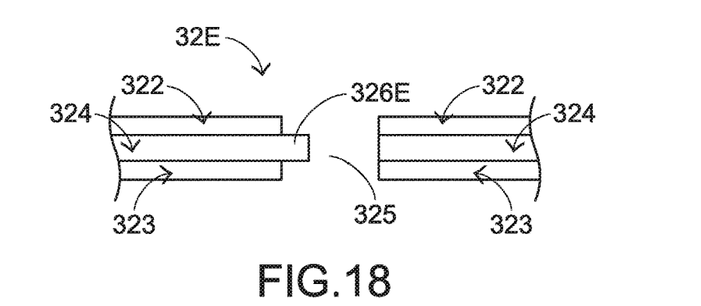
FIG. 18 is a schematic cross-sectional view illustrating a portion of a keyboard device according to a sixth embodiment of the present invention.

FIG. 18 is a schematic cross-sectional view illustrating a portion of a keyboard device according to a sixth embodiment of the present invention. As shown in FIG. 18, the circuit board extension part 326E of the membrane wiring board 32E is extended from the intermediate film layer 324 toward the circuit board opening 325. That is, the circuit board extension part 326E is extended over the upper film layer 322 and the lower film layer 323. When the connecting element (not shown in FIG. 18) interferes with the corresponding circuit board extension part 326E, a click sound is generated. Under this circumstance, the user can feel the enhanced feedback of depressing the keycap 301.

Figure 19:
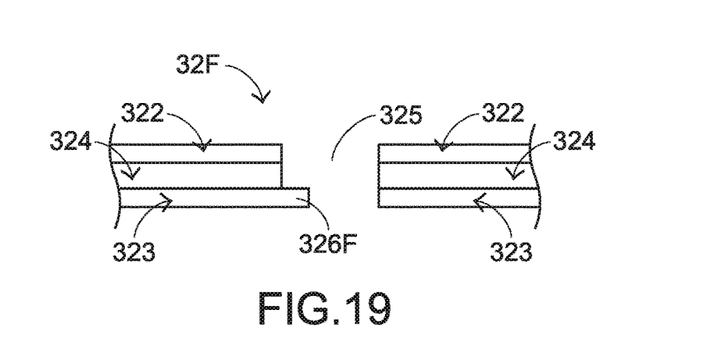
FIG. 19 is a schematic cross-sectional view illustrating a portion of a keyboard device according to a seventh embodiment of the present invention.

FIG. 19 is a schematic cross-sectional view illustrating a portion of a keyboard device according to a seventh embodiment of the present invention. As shown in FIG. 19, the circuit board extension part 326F of the membrane wiring board 32F is extended from the lower film layer 323 toward the circuit board opening 325. That is, the circuit board extension part 326F is extended over the upper film layer 322 and the intermediate film layer 324. When the connecting element (not shown in FIG. 19) interferes with the corresponding circuit board extension part 326F, a click sound is generated. Under this circumstance, the user can feel the enhanced feedback of depressing the keycap 301.

From the above descriptions, the present invention provides a keyboard device with a membrane switch. The keyboard device is slim has reduced fabricating cost. The connecting element of the key structure interferes with the membrane wiring board or the base plate to provide a feedback feel like a mechanical switch. Consequently, the keyboard device is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. A keyboard device, comprising:
a base plate;
a key structure comprising a keycap and a connecting element, wherein the connecting element is connected between the base plate and the keycap, wherein when the connecting element is operated along a movable range, the keycap is moved upwardly or downwardly relative to the base plate; and
a membrane wiring board arranged between the key structure and the base plate, and comprising a membrane switch corresponding to the key structure,
wherein the membrane wiring board comprises at least one circuit board opening and a circuit board extension part, wherein the circuit board extension part is extended toward the at least one circuit board opening, and the circuit board extension part is located within the movable range of the connecting element, wherein when the connecting element is operated, the connecting element interferes with the circuit board extension part.

2. The keyboard device according to claim 1, wherein the membrane wiring board comprises plural film layers in a stack form, and the circuit board extension part is extended from one film layer of the plural film layers in a direction toward the at least one circuit board opening and extended over another film layer of the plural film layers.

3. The keyboard device according to claim 2, wherein the plural film layers comprise an upper film layer and a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each by a spacing interval and collectively defined as the membrane switch.

4. The keyboard device according to claim 1, wherein the connecting element is a scissors-type connecting element comprising a first frame and a second frame, and the second frame is pivotally coupled to the first frame.

5. The keyboard device according to claim 4, wherein the movable range is defined as a traveling distance of the connecting element when the first frame and the second frame are switched from an open-scissors state to a stacked state.

6. The keyboard device according to claim 4, wherein the first frame comprises a frame extension part, and the frame extension part is externally extended from the first frame, wherein when the scissors-type connecting element is operated, the frame extension part interferes with the circuit board extension part.

7. A keyboard device, comprising:
a base plate;
a key structure comprising a keycap and a connecting element, wherein the connecting element is connected between the base plate and the keycap, wherein when the connecting element is operated along a movable range, the keycap is moved upwardly or downwardly relative to the base plate; and
a membrane wiring board arranged between the key structure and the base plate, and comprising a membrane switch corresponding to the key structure,
wherein the base plate comprises at least one base plate opening and a base plate extension part, wherein the base plate extension part is extended toward the at least one base plate opening, and the base plate extension part is located within the movable range of the connecting element, wherein when the connecting element is operated, the connecting element interferes with the base plate extension part.

8. The keyboard device according to claim 7, wherein the membrane wiring board comprises an upper film layer and a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each by a spacing interval and collectively defined as the membrane switch.

9. The keyboard device according to claim 7, wherein the connecting element is a scissors-type connecting element comprising a first frame and a second frame, and the second frame is pivotally coupled to the first frame.

10. The keyboard device according to claim 9, wherein the movable range is defined as a traveling distance of the connecting element when the first frame and the second frame are switched from an open-scissors state to a stacked state.

11. The keyboard device according to claim 9, wherein the first frame comprises a frame extension part, and the frame extension part is externally extended from the first frame, wherein when the scissors-type connecting element is operated, the frame extension part interferes with the base plate extension part.

* * * * *